US011325670B2

(12) United States Patent
Tanaka et al.

(10) Patent No.: US 11,325,670 B2
(45) Date of Patent: May 10, 2022

(54) SADDLE RIDING VEHICLE

(71) Applicant: HONDA MOTOR CO., LTD., Tokyo (JP)

(72) Inventors: Takuro Tanaka, Tokyo (JP); Keita Mikura, Tokyo (JP); Shota Yamasaki, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/100,139

(22) Filed: Nov. 20, 2020

(65) Prior Publication Data
US 2021/0155308 A1 May 27, 2021

(30) Foreign Application Priority Data
Nov. 26, 2019 (JP) .............................. JP2019-213438

(51) Int. Cl.
*B62J 6/01* (2020.01)
*B62J 6/05* (2020.01)
*B62J 6/02* (2020.01)
*B62K 21/04* (2006.01)

(52) U.S. Cl.
CPC . *B62J 6/01* (2020.02); *B62J 6/02* (2013.01); *B62J 6/05* (2020.02); *B62K 21/04* (2013.01)

(58) Field of Classification Search
CPC ....... B62J 6/01; B62J 6/02; B62J 6/05; B62K 21/04
See application file for complete search history.

(56) References Cited

U.S. PATENT DOCUMENTS 6,135,625 A * 10/2000 Kodaira ................. H05B 41/24
362/476

FOREIGN PATENT DOCUMENTS

| JP | S58-78875 A | 5/1983 |
| JP | H06-115473 | 4/1994 |
| JP | H09-175463 A | 7/1997 |
| JP | 2004-282879 A | 10/2004 |
| JP | 2007-276624 A | 10/2007 |
| JP | 2009-161011 A | 7/2009 |
| JP | 2010-089580 A | 4/2010 |
| WO | 2017-169106 A1 | 10/2018 |

OTHER PUBLICATIONS

Japanese Office Action with English translation dated Aug. 31, 2021, 9 pages.

* cited by examiner

*Primary Examiner* — Thomas M Sember
(74) *Attorney, Agent, or Firm* — Rankin, Hill & Clark LLP

(57) ABSTRACT

A saddle riding vehicle includes a front fork including a pair of left and right fork tubes and a pair of top and bottom bridges connecting the left and right fork tubes, a headlight, and an electric part accommodating member accommodating electric parts, the electric part accommodating member being disposed on the rear side of the headlight in a space surrounded by the left and right fork tubes and the top and bottom bridges. The electric part accommodating member includes a fastening section fixed to the front fork by a fastening member and a fitting section fitted and fixed to the bridge.

12 Claims, 9 Drawing Sheets

SADDLE RIDING VEHICLE

INCORPORATION BY REFERENCE

The present application claims priority under 35 U.S.C. 119 to Japanese Patent Application No. 2019-213438 filed on Nov. 26, 2019. The content of the application is incorporated herein by reference in its entirety.

TECHNICAL FIELD

The present invention relates to a saddle riding vehicle.

BACKGROUND ART

Conventionally, there has been known a saddle riding vehicle that includes a front fork including a pair of left and right fork tubes and a pair of top and bottom bridges connecting the left and right fork tubes, a headlight, and an electric part accommodating member that accommodates electric parts, in which the electric part accommodating member is disposed on the rear side of the headlight in a space surrounded by the left and right fork tubes and the top and bottom bridges (see, for example, Patent Document 1). In Patent Document 1, the electric part accommodating member includes a fastening section fixed to a stay on the vehicle body side by a fastening member.

PRIOR ART DOCUMENT

Patent Document

[Patent Document 1]
Japanese Patent Laid-Open No. Hei 6-115473

SUMMARY OF THE INVENTION

Problem to be Solved by the Invention

However, in the above-mentioned conventional saddle riding vehicle, the fastening section of the electric part accommodating member is located on the rear side of the headlight, and, therefore, the headlight serves as an obstacle when making access to the fastening section, and it is difficult to detach and attach the electric part accommodating member. For this reason, a maintenance work for the electric parts and the like is intricate to carry out.

The present invention has been made in consideration of the aforementioned circumstances. It is an object of the present invention to facilitate attachment/detachment of an electric part accommodating member disposed on the rear side of a headlight, in a saddle riding vehicle.

Means for Solving the Problem

The present invention provides a saddle riding vehicle including a front fork (12) including a pair of left and right fork tubes (26) and a pair of top and bottom bridges (24, 25) connecting the left and right fork tubes (26), a headlight (44), and an electric part accommodating member (60) accommodating an electric part (74, 75), the electric part accommodating member (60) being disposed on the rear side of the headlight (44) in a space (59) surrounded by the left and right fork tubes (26) and the top and bottom bridges (24, 25). The electric part accommodating member (60) includes a fastening section (82) fixed to the front fork (12) by a fastening member (55) and a fitting section (81) fitted and fixed to one of the bridges (24).

In addition, in the aforementioned configuration, the headlight (44) may overlap with the fitting section (81) from the front side, in a vehicle front view, and the fastening section (82) may be disposed on the vehicle width directionally outer side relative to the fitting section (81).

Besides, in the aforementioned configuration, a turn signal support member (54) supporting a turn signal (50) may be fixed to one of the fork tubes (26) by the fastening member (55), and the fastening section (82) may be co-fastened to the turn signal support member (54) by the fastening member (55).

Further, in the aforementioned configuration, the fitting section (81) and the fastening section (82) may be provided in a state of being aligned in a vehicle width direction at an upper end portion or a lower end portion of the electric part accommodating member (60), and the fitting section (31) may be provided at one end portion in the vehicle width direction, while the fastening section (82) may be provided at the other end portion in the vehicle width direction.

In addition, in the aforementioned configuration, the electric part (74, 75) may be a connector connecting harnesses (76b, 57b, 77c, 57e) to one another, and one of the harnesses (76b, 77c) connected to the connector from above may include a curved section (81b, 82b) curved in a U shape below a connection section (91e, 92e) between the harness (76b, 77c) and the connector.

Besides, in the aforementioned configuration, the electric part accommodating member (60) may include an opening (83, 84) through which a harness (76b, 77c, 57b, 57d, 57e) accommodated in the electric part accommodating member (60) is passed, and an inner peripheral surface of the opening (83, 84) may be provided with a curved surface section (83c, 84c) where the opening (83, 84) is gradually increased in diameter toward the outer side of the opening (83, 84).

In addition, in the aforementioned configuration, the electric part accommodating member (60) may overlap with the fork tubes (26), and may be disposed on the rear side relative to an extension line (24e) of a front surface section of the bridge (24) on the upper side, in a vehicle side view.

Besides, in the aforementioned configuration, a front surface of the electric part accommodating member (60) may be provided with a recess (60a), and at least a part of the recess (60a) may be along a rear portion of the headlight (44).

Further, in the aforementioned configuration, the electric part accommodating member (60) may be a box-shaped member including a case section (85) and a lid section (86) covering the case section (85) in a closable and openable manner, the electric part accommodating member (60) may include a first fitting section (81a) provided at the case section (85) and a second fitting section (81b) provided at the lid section (86), and, when the case section (85) is closed with the lid section (86), the first fitting section (81a) and the second fitting section (81b) may be mated with each other to form the fitting section (81), and the fitting section (81) may be inserted into a fitting hole (93) provided in the bridge (24).

In addition, in the aforementioned configuration, the electric part accommodating member (60) may be a box-shaped member including a case section (85) and a lid section (86) covering the case section (85) in a closable and openable manner, the electric part accommodating member (60) may include a first fastening section (82a) provided at the case section (85) and a second fastening section (82b) provided at the lid section (86), and, when the case section

(85) is closed with the lid section (86), the first fastening section (82a) and the second fastening section (82b) may be mated with each other to form the fastening section (82), and the fastening member (55) may be inserted in and passed through the first fastening section (82a) and the second fastening section (82b).

Besides, in the aforementioned configuration, the fitting section (81) may be inserted into a lower surface (24a) of the bridge (24) on the upper side from below.

Effect of the Invention

The saddle riding vehicle includes the front fork including the pair of left and right fork tubes and the pair of top and bottom bridges connecting the left and right fork tubes, the headlight, and the electric part accommodating member accommodating the electric part, the electric part accommodating member being disposed on the rear side of the headlight in the space surrounded by the left and right fork tubes and the top and bottom bridges. The electric part accommodating member includes the fastening section fixed to the front fork by the fastening member and the fitting section fitted and fixed to one of the bridges.

According to this configuration, in the case of detaching the electric part accommodating member, it is possible, by releasing the fastening of the fastening section, to pull the fitting section out of the bridge and to easily detach the electric part accommodating member from the front fork. In addition, in the case of attaching the electric part accommodating member, it is possible, by fastening the fastening section in the state in which the fitting section is fitted to the bridge, to attach the electric part accommodating member to the front fork easily and firmly.

Besides, in the aforementioned configuration, the headlight may overlap with the fitting section from the front side, in a vehicle front view, and the fastening section may be disposed on a vehicle width directionally outer side relative to the fitting section.

According to this configuration, since the fastening section is disposed on the vehicle width directionally outer side relative to the fitting section, it is easy to make access to the fastening section, and fastening of the fastening section and releasing of the fastening can be easily performed. In addition, since the fitting section is only fitted to the bridge, fitting of the fitting section and releasing of the fitting can be easily carried out, notwithstanding the fitting section is located on the vehicle width directionally inner side relative to the fastening section.

Besides, in the aforementioned configuration, the turn signal support member supporting the turn signal may be fixed to one of the fork tubes by the fastening member, and the fastening section may be co-fastened to the turn signal support member by the fastening member.

According to this configuration, by using the fastening member for the turn signal support member, the fastening section of the electric part accommodating member can be fixed to the front fork with a simple structure.

Further, in the aforementioned configuration, the fitting section and the fastening section may be provided in the state of being aligned in the vehicle width direction at the upper end portion or the lower end portion of the electric part accommodating member, the fitting section may be provided at one end portion in the vehicle width direction, while the fastening section may be provided at the other end portion in the vehicle width direction.

According to this configuration, the electric part accommodating member can be fixed to the front fork easily and firmly.

In addition, in the aforementioned configuration, the electric part may be the connector connecting the harnesses to one another, and one of the harnesses connected to the connector from above may include the curved section curved in the U shape below the connection section between the harness and the connector.

According to this configuration, since water flowing along the harness is stopped at the U-shaped curved section, the water flowing along the harness can be restrained from reaching the connection section between the harness and the connector.

Besides, in the aforementioned configuration, the electric part accommodating member may include the opening through which the harness accommodated in the electric part accommodating member is passed, and the inner peripheral surface of the opening may be provided with the curved surface section where the opening is gradually enlarged in diameter toward the outer side of the opening.

According to this configuration, since the inner peripheral surface of the opening is provided with the curved surface section, the harness is prevented from strongly colliding against the opening, and the harness can be protected.

In addition, in the aforementioned configuration, the electric part accommodating member may overlap with the fork tubes, and may be disposed on the rear side relative to the extension line of the front surface section of the bridge on the upper side, in the vehicle side view.

According to this configuration, the electric part accommodating member can be disposed to be compact in the longitudinal vehicle direction between the left and right fork tubes.

Besides, in the aforementioned configuration, the front surface of the electric part accommodating member may be provided with the recess, and at least a part of the recess may be along the rear portion of the headlight.

According to this configuration, the headlight can be disposed near the front surface of the electric part accommodating member, so that the headlight can be disposed to be compact in the longitudinal vehicle direction.

Further, in the aforementioned configuration, the electric part accommodating member may be the box-shaped member including the case section and the lid section covering the case section in a closable and openable manner, the electric part accommodating member may include the first fitting section provided at the case section and the second fitting section provided at the lid section, and when the case section is closed with the lid section, the first fitting section and the second fitting section may be mated with each other to form the fitting section, and the fitting section may be inserted into the fitting hole provided in the bridge.

According to this configuration, in a state in which the fitting section formed by mating the first fitting section and the second fitting section with each other is inserted in the fitting hole of the bridge, the lid section is locked in a closed state by the fitting hole. Therefore, the lid section covering the case section can be locked in the closed state with a simple structure.

In addition, in the aforementioned configuration, the electric part accommodating member may be the box-shaped member including the case section and the lid section covering the case section in a closable and openable manner, the electric part accommodating member may include the first fastening section provided at the case section and the second fastening section provided at the lid section, and, when the case section is closed with the lid section, the first fastening section and the second fastening section may be mated with each other to form the fastening section, and the fastening member may be inserted in and passed through the first fastening section and the second fastening section.

According to this configuration, in a state in which the fastening section formed by mating the first fastening section and the second fastening section with each other is fastened by the fastening member, the lid section is locked in a closed state by the fastening member. Therefore, the lid section covering the case section can be locked in the closed state with a simple structure.

Besides, in the aforementioned configuration, the fitting section may be inserted into the lower surface of the bridge on the upper side from below.

According to this configuration, the electric part accommodating member disposed between the top and bottom bridges can be easily fixed to the bridge on the upper side through the fitting section.

MODE FOR CARRYING OUT THE INVENTION

Figure 1:
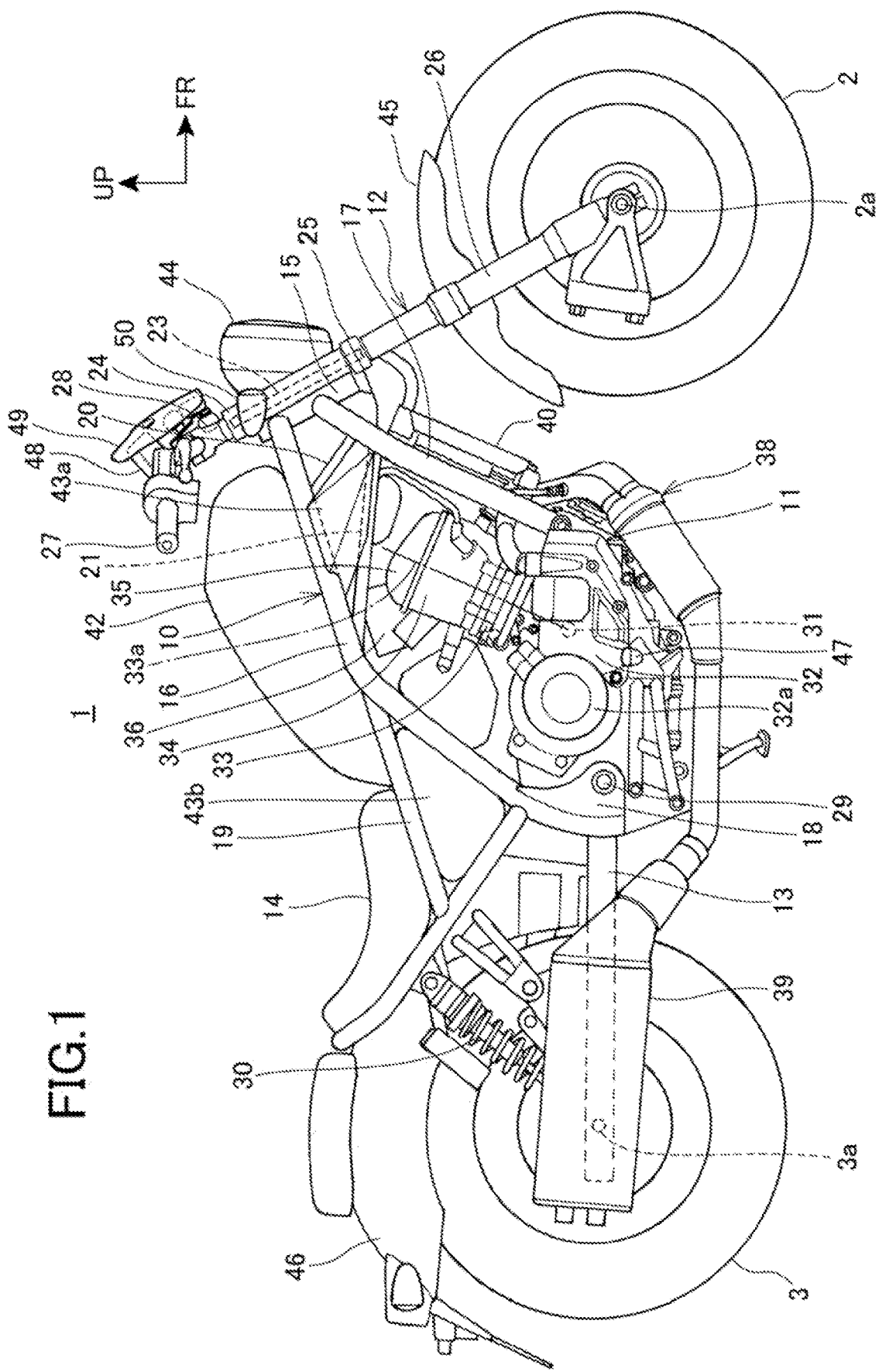
FIG. 1 is a right side view of a motorcycle according to an embodiment of the present invention.

An embodiment of the present invention will be described below, referring to the drawings. Note that, in the following description, the directions such as forward and rearward directions, leftward and rightward directions, and upward and downward directions are the same as those with reference to the vehicle body, unless specified otherwise. In addition, a symbol FR in each drawing indicates the vehicle body front side, a symbol UP indicates the vehicle body upper side, and a symbol LH indicates the vehicle body left-hand side.

FIG. 1 is a right side view of a motorcycle 1 according to an embodiment of the present invention.

The motorcycle 1 is a vehicle in which an engine 11 as a power unit is supported by a body frame 10, a front fork 12 supporting a front wheel 2 in a steerable manner is steerably supported on a front end of the body frame 10, and a swing arm 13 supporting a rear wheel 3 is provided on the rear side of the body frame 10.

The motorcycle 1 is a saddle riding vehicle in which a rider is seated astride a seat 14 provided on the upper side of a rear portion of the body frame 10.

The body frame 10 includes a head pipe 15 provided at a front end of the body frame 10, a pair of left and right main frames 16 extending rearwardly downward from the head pipe 15, a pair of left and right down frames 17 extending rearwardly downward from the rear side of the main frames 16 with respect to the head pipe 15, a pair of left and right pivot frames 18 extending downward from rear ends of the main frames 16, and seat frames 19 extending rearward from rear portions of the main frames 16 and upper portions of the pivot frames 18.

In addition, the body frame 10 includes a pair of left and right first reinforcement frames 20 that connect upper portions of the down frames 17 and upper portions of the main frames 16, and a pair of left and right second reinforcement frames 21 that connect upper portions of the down frames 17 and the main frames 16 on the lower side of the first reinforcement frames 20.

The front fork 12 includes a steering shaft 23 rotatably shaft-supported by the head pipe 15, a top bridge 24 (bridge, bridge on the upper side) fixed to an upper end of the steering shaft 23, a bottom bridge 25 (bridge) fixed to a lower end of the steering shaft 23, and a pair of left and right fork tubes 26 supported by the top bridge 24 and the bottom bridge 25. The fork tube 26 is a telescopic type suspension.

The top bridge 24 extends in the vehicle width direction from the steering shaft 23 on the upper side of the head pipe 15, and connects upper end portions of the left and right fork tubes 26.

The bottom bridge 25 extends in the vehicle width direction from the steering shaft 23 on the lower side of the head pipe 15, and connects the left and right fork tubes 26.

The fork tubes 26 are disposed in a rearwardly inclined state in a vehicle side view. The front wheel 2 is shaft-supported by an axle 2a bridgingly arranged between lower end portions of the left and right fork tubes 26.

A handlebar 27 for the rider to steer the front fork 12 to the left or right is attached to the top bridge 24 through a handle post 23.

The swing arm 13 is shaft-supported by a pivot shaft 29 supported by the left and right pivot frames 18. The pivot shaft 29 extends horizontally in the vehicle width direction. The swing arm 13 has a front end portion shaft-supported by the pivot shaft 29, and is swung upward and downward with the pivot shaft 29 as a center.

The rear wheel 3 is shaft-supported by an axle 3a provided at a rear end portion of the swing arm 13.

The motorcycle 1 includes a pair of left and right rear suspensions 30 bridgingly arranged between a rear end portion of the swing arm 13 and the seat frames 19.

The engine 11 is disposed between the down frames 17 and the pivot frames 18 in the longitudinal vehicle direction under the main frames 16, and is fixed to the body frame 10.

The engine 11 includes a crankcase 32 supporting a crankshaft 31 extending horizontally in the vehicle width direction (left-right direction), a cylinder 33 provided at an upper portion of a front portion of the crankcase 32, a cylinder head 34 connected to an upper surface of the cylinder 33, and a head cover 35 attached to an upper surface of the cylinder head 34. A cylinder axis 33a of the cylinder 33 is forwardly inclined relative to the vertical direction.

An intake device 36 of the engine 11 is connected to an intake port at a rear surface of the cylinder head 34.

An exhaust device of the engine 11 includes an exhaust pipe 38 connected to an exhaust port at a front surface of the cylinder head 34, and a muffler 39 connected to a downstream end of the exhaust pipe 38.

A rear portion of the crankcase 32 is a transmission case section 32a which accommodates a transmission. An output power of the engine is transmitted to the rear wheel 3 through a drive chain (not illustrated) connecting an output shaft of the transmission and the rear wheel 3.

A radiator 40 through which cooling water for the engine 11 passes is disposed under the head pipe 15 and on the front side of the engine 11.

A fuel tank 42 is disposed between the head pipe 15 and the seat 14 on the upper side of the main frames 16.

A body cover of the motorcycle 1 includes a front-side side cover 43a covering between the first reinforcement frames 20 and the second reinforcement frames 21, and a rear-side side cover 43b covering between the seat frames 19 and the main frames 16.

A headlight 44 is provided on the front side of the head pipe 15.

A front fender 45 covering the front wheel 2 from above is supported by the fork tubes 26.

The rear wheel 3 is covered from above by a rear fender 46 disposed on the rear side of the seat 14.

A pair of left and right steps 47 on which the rider on the seat 14 put his or her feet are disposed on the front side of the left and right pivot frames 18.

A meter 48 displaying information concerning the motorcycle 1 such as vehicle velocity is disposed on the upper side of the handlebar 27. The motorcycle 1 includes a visor 49 covering the meter 48 and the like from the front side.

A pair of left and right turn signals 50 are attached to upper portions of the front fork 12.

Figure 2:
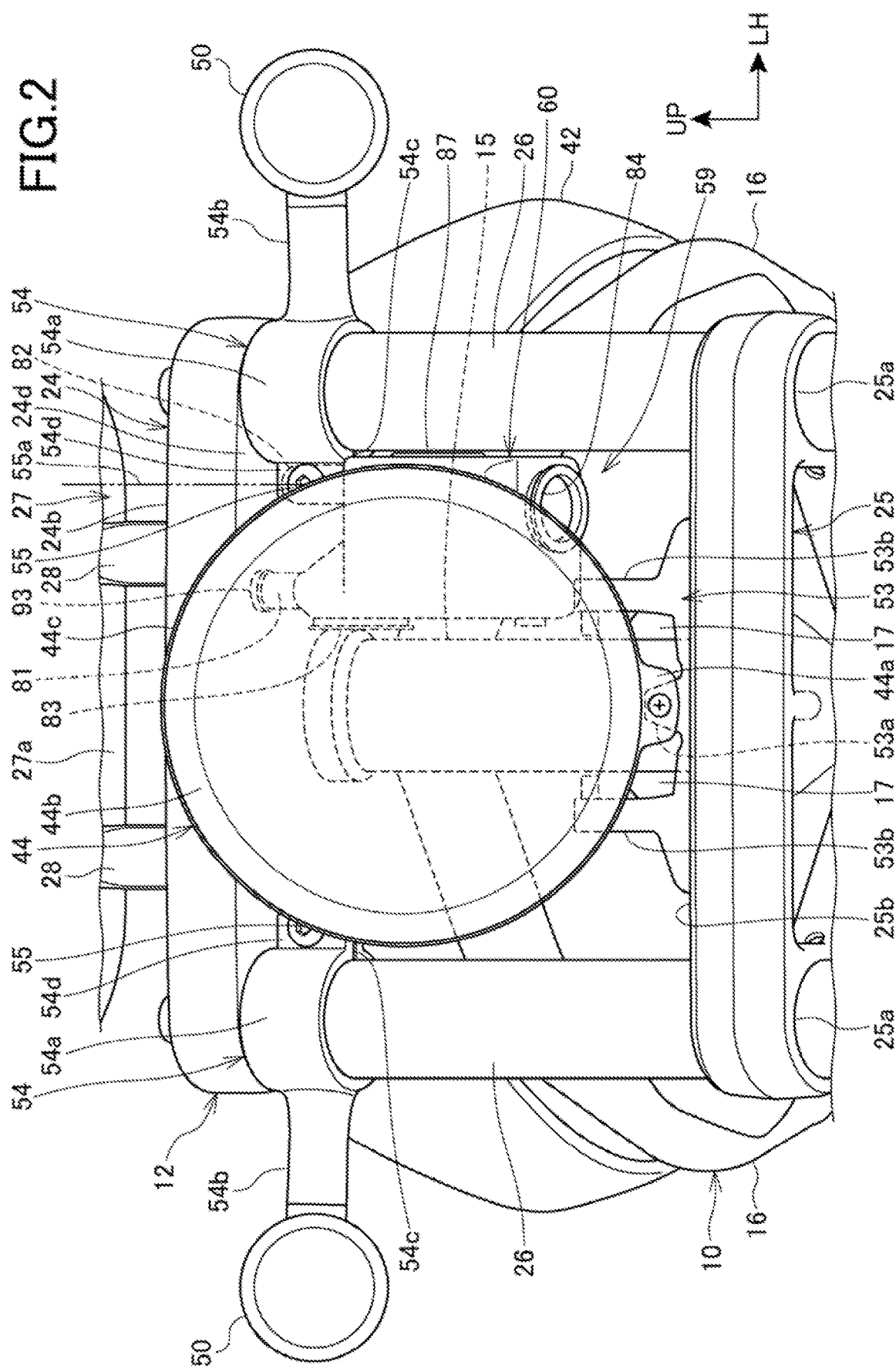
FIG. 2 is a front view, as viewed from the front side, of an upper portion of a front portion of the motorcycle.
Figure 3:
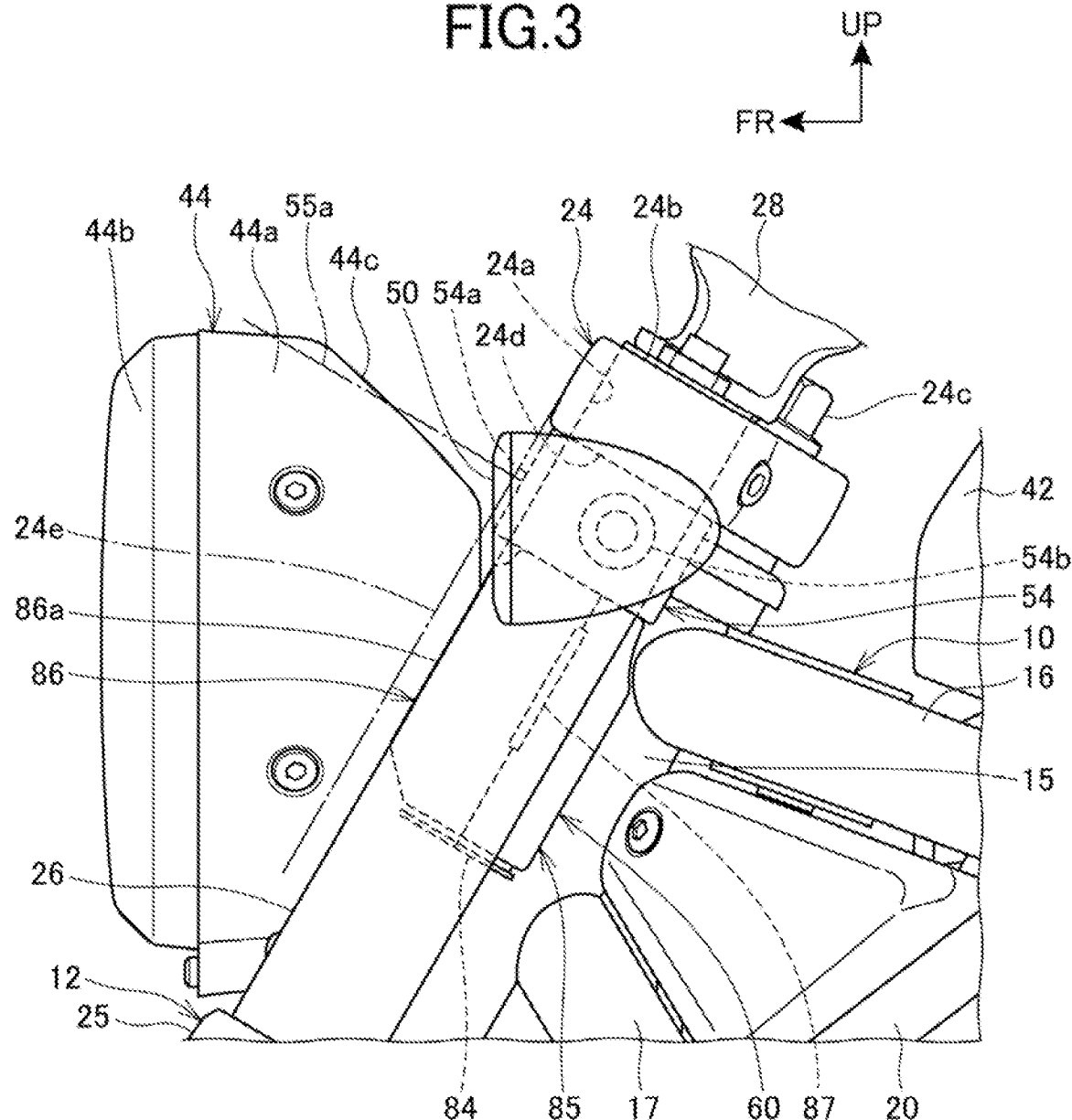
FIG. 3 is a left side view of the upper portion of the front portion of the motorcycle.
Figure 4:
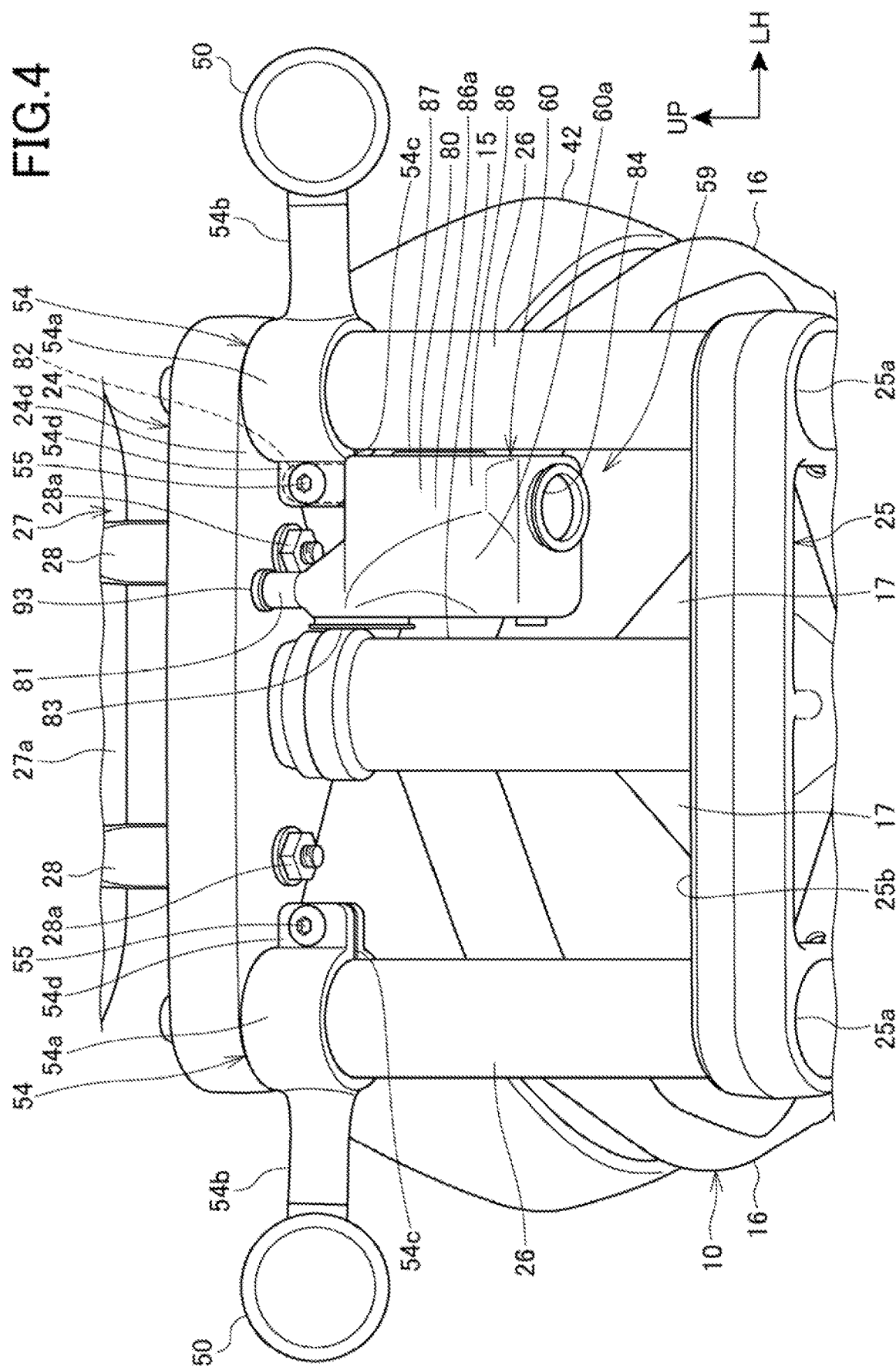
FIG. 4 is a front view depicting a state in which the headlight is detached, in FIG. 2.

FIG. 2 is a front view, as viewed from the front side, of an upper portion of a front portion of the motorcycle 1. FIG. 3 is a left side view of the upper portion of the front portion of the motorcycle 1. FIG. 4 is a front view depicting a state in which the headlight 44 is detached, in FIG. 2. Note that in FIGS. 2 to 4, each harness which will be described later is not illustrated.

Referring to FIGS. 2 to 4, the top bridge 24 is a plate-shaped member extending in the vehicle width direction (left-right direction), and is provided at both end portions in the vehicle width direction with fork support holes 24a (FIG. 3) in which upper end portions of the fork tubes 26 are fitted.

The top bridge 24 is fastened to an upper end portion of the steering shaft 23 (FIG. 1) through a stem nut 24c provided at the center in the vehicle width direction of an upper surface 24b of the top bridge 24.

Since the fork tubes 26 are inclined rearward, the upper surface 24b and a lower surface 24d of the top bridge 24 are inclined surfaces inclined rearwardly downward in a vehicle side view.

The bottom bridge 25 is a plate-shaped member extending in the vehicle width direction in parallel to the top bridge 24, and is provided at both end portions in the vehicle width direction with fork support holes 25a in which the fork tubes 26 are fitted. A central portion of the steering shaft 23 is connected to a central portion in the vehicle width direction of the bottom bridge 25.

The headlight 44 is disposed between the left and right fork tubes 26 and between the top bridge 24 and the bottom bridge 25. The headlight 44 is disposed at the center in the vehicle width direction, and overlaps with the head pipe 15 from the front side.

The headlight 44 includes a headlight case 44a supporting a light emitting element (not illustrated), and a lens 44b that closes an opening at a front surface of the headlight case 44a and covers the light emitting element from the front side. The headlight case 44a is substantially circular in a vehicle front view, and an outer peripheral surface 44c of the headlight case 44a has a cylindrical shape reduced in diameter toward the rear side from the front surface side of the headlight case 44a.

The headlight 44 is supported by a headlight stay 53 attached to an upper surface 25b of the bottom bridge 25.

The headlight stay 53 integrally includes a central fixing section 53a provided in the center in the vehicle width direction, and a pair of left and right side-part fixing sections 53b provided on outer sides of the central fixing section 53a.

The central fixing section 53a is connected to a lower end portion of the headlight case 44a. Each of the side-part fixing sections 53b is disposed between the head pipe 15 and the fork tubes 26, and extends to above the central fixing section 53a. The pair of side-part fixing sections 53b are connected respectively to left and right side portions of a lower portion of the headlight case 44a.

The headlight 44 is supported by only the bottom bridge 25 through the headlight stay 53, and is not fixed to other portions of the front fork 12.

At an upper end portion of each fork tube 26, a turn signal support member 54 supporting the turn signal 50 is provided under the top bridge 24.

The turn signal support member 54 includes a tubular section 54a fitted to an outer periphery of the fork tube 26, and an arm section 54b extending toward the vehicle width directionally outer side from the outer periphery of the tubular section 54a. The turn signal 50 is attached to a tip of the arm section 54b. The turn signal support member 54 is disposed such that an upper end of the tubular section 54a comes into contact with or comes into proximity to the lower surface 24d of the top bridge 24.

The tubular section 54a is a clamper fixed to the fork tube 26 in a slit fastening structure by a fastening member 55 that reduces diameter of the tubular section 54a. The tubular section 54a is formed in a C shape in an axial view, by providing a cutout 54c extending in the axial direction of the tubular section 54a.

Each turn signal support member 54 includes a pair of flange sections 54d to which the fastening member 55 is fastened. The pair of flange sections 54d are provided along the cutout 54c, and extend toward radially outer sides of the tubular section 54a from both open end portions of the C shape of the tubular section 54a.

The fastening member 55 is inserted in and passed through the pair of flange sections 54d from the front side. With the fastening member 55 fastened to the flange section 54d, the gap of the cutout 54c is reduced, and the tubular section 54a is fixed to the fork tube 26.

The arm section 54b of the turn signal support member 54 extends toward the vehicle width directionally outer side relative to the fork tube 26. The flange section 54d is located on the opposite side of the arm section 54b, and extends toward the vehicle width directionally inner side relative to the fork tube 26.

A pair of left and right handle posts 28 are provided at the upper surface 24b of the top bridge 24.

Specifically, the handle posts 28 are disposed between the fork support hole 24a on one of the left and right sides and the stem nut 24c, and between the fork support hole 24a on the other of the left and right sides and the stem nut 24c.

The handle posts 28 are fastened and fixed to the top bridge 24, and extend upward from the upper surface 24b. A handle post fastener 28a that fastens the handle post 28 to the top bridge 24 extends downward from a lower surface of the handle post 28, penetrates the top bridge 24, and projects downward from the lower surface 24d of the top bridge 24. The handlebar 27 is supported by upper end portions of the handle posts 28.

An electric part accommodating member 60 accommodating the electric parts to be described later is disposed on the rear side of the headlight 44 and in a space 59 surrounded by the left and right fork tubes 26, the top bridge 24, and the bottom bridge 25.

Figure 5:
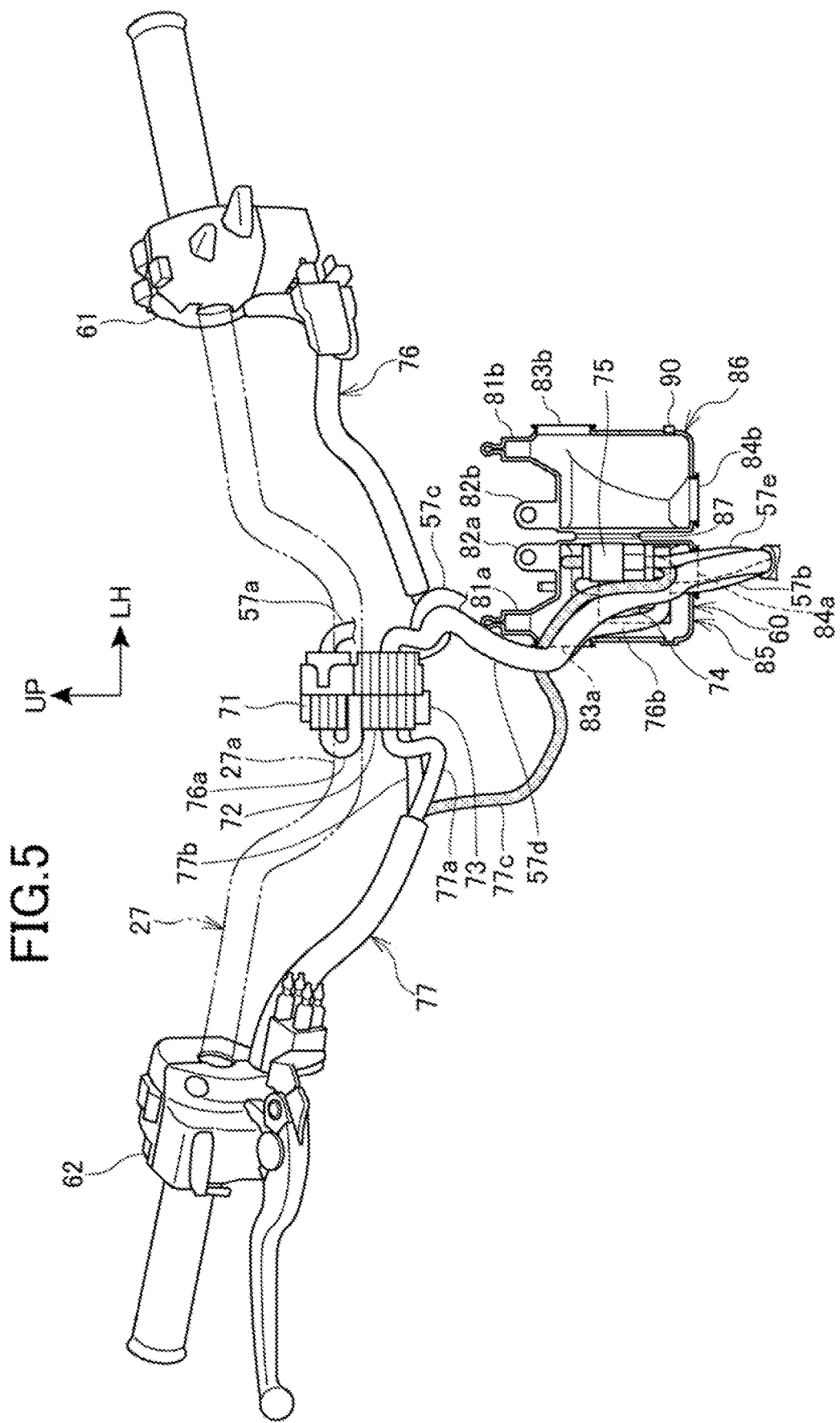
FIG. 5 is a view, from the front side, of the layout of parts concerning electric equipment in the periphery of a handlebar.

FIG. 5 is a view, from the front side, of the layout of parts concerning electric equipment in the periphery of the handlebar 27. In FIG. 5, the electric part accommodating member 60 is depicted in an opened state.

A one-side operation section 61 for operating electric equipment and the like of the motorcycle 1 is provided at one end portion of the left and right sides of the handlebar 27, and an other-side operation section 62 for operating the electric equipment and the like of the motorcycle 1 is provided at the other end portion of the left and right sides of the handlebar 27. The one-side operation section 61 and the other-side operation section 62 are operation parts for operating, for example, lights of the motorcycle 1, an operation mode of the engine 11, a horn, a throttle of the intake system, the meter 48, and the like.

A first connector 71, a second connector 72, and a third connector 73 are collectively disposed in the vicinity of a central portion 27a in the vehicle width direction of the handlebar 27. The first connector 71, the second connector 72, and the third connector 73 are supported by stays (not illustrated) attached to the handle post 28.

In addition, a fourth connector 74 (electric part) and a fifth connector 75 (electric part) disposed below the handlebar 27 are accommodated in the electric part accommodating member 60.

A harness 76 extending toward the vehicle width directionally inner side from the one-side operation section 61 is branched in the vicinity of the handlebar 27 into a harness 76a and a harness 76b (harness connected to the connector from above, harness accommodated in the electric part accommodating member).

The harness 76a is connected to a harness 57a on the power source side of the motorcycle 1 through the first connector 71. The harness 57a extends downward from the first connector 71.

The harness 76b extends downward from the branching part, and is connected to a harness 57b (harness accommodated in the electric part accommodating member) on the power source side of the motorcycle 1 through the fourth connector 74. The harness 57b extends downward from the fourth connector 74. The harness 76a and the harness 57b are connected to each other by the fourth connector 74.

A harness 77 extending toward the vehicle width directionally inner side from the other-side operation section 62 is branched in the vicinity of the handlebar 27 into a harness 77a, a harness 77b, and a harness 77c (harness connected to the connector from above, harness accommodated in the electric part accommodating member). Note that the harness 77c is dotted such as to permit easy discrimination in the figure.

The harness 77a is connected to a harness 57c on the power source side of the motorcycle 1 through the second connector 72. The harness 57c extends downward from the second connector 72.

The harness 77b is connected to a harness 57d (harness accommodated in the electric part accommodating member) on the power source side of the motorcycle 1 through the third connector 73. The harness 57d extends downward from the third connector 73.

The harness 77c extends downward from the branching part, and is connected to a harness 57e (harness accommodated in the electric part accommodating member) on the power source side of the motorcycle 1 through the fifth connector 75. The harness 57e extends downward from the fifth connector 75.

Figure 6:
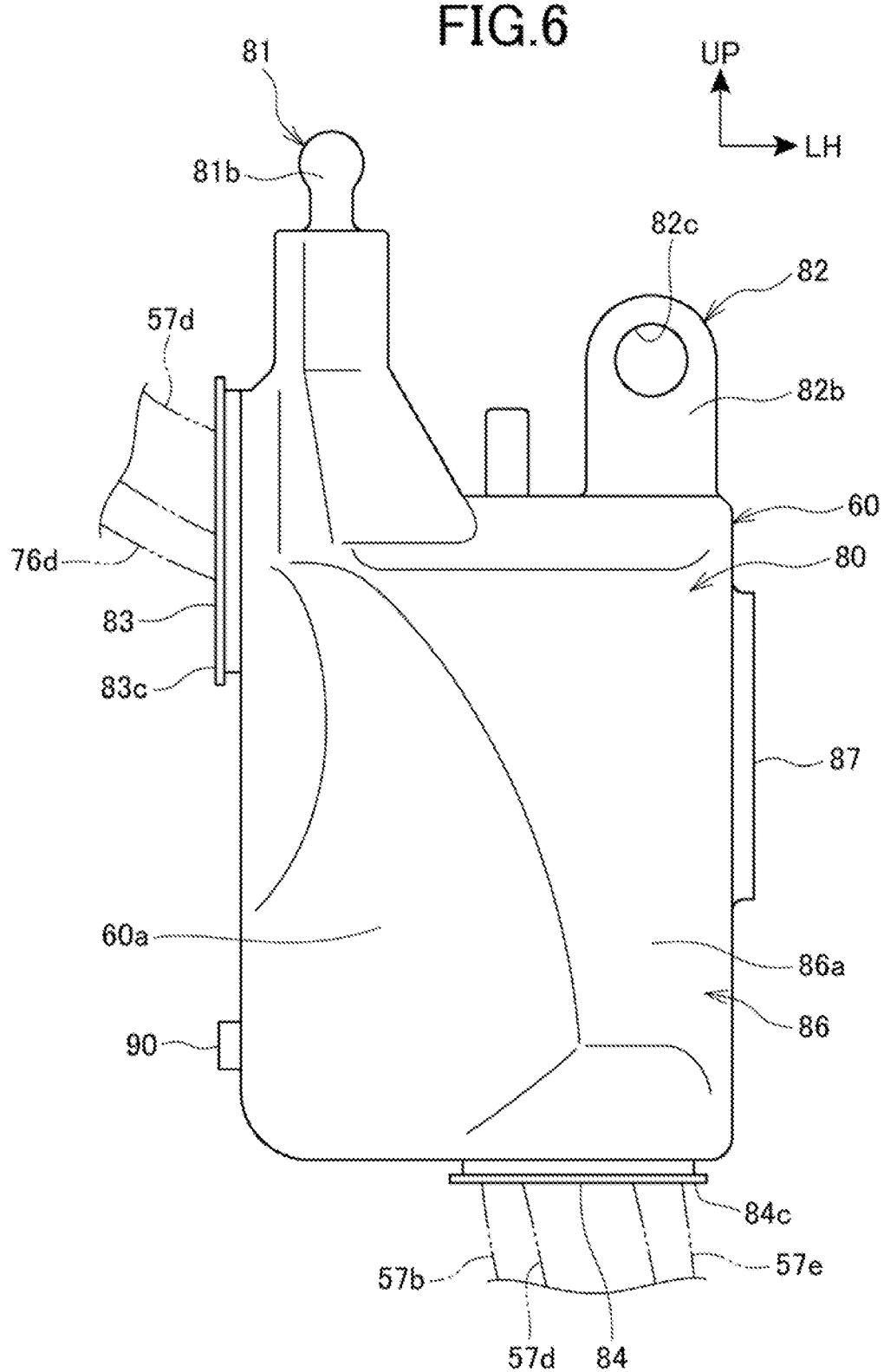
FIG. 6 is a front view, as viewed from the front side, of an electric part accommodating member.

FIG. 6 is a front view, as viewed from the front side, of the electric part accommodating member 60.

Referring to FIGS. 4 to 6, the electric part accommodating member 60 includes a box-shaped section 80 which is hollow inside, a fitting section 81 extending upward from an upper surface of the box-shaped section 80, and a fastening section 82 extending upward from the upper surface of the box-shaped section 80 on the lateral side of the fitting section 81. The box-shaped section 80 is longer in the vertical direction than in the vehicle width direction.

In addition, the electric part accommodating member 60 is provided at an upper portion of a side surface section on the vehicle width directionally inner side with a side-surface opening 83 (opening) through which the hollow part of the box-shaped section 80 is opened to the vehicle width directionally inner side, and is provided at a lower surface with a lower-surface opening 84 (opening) through which the hollow part of the box-shaped section 80 is opened to the lower side.

Figure 7:
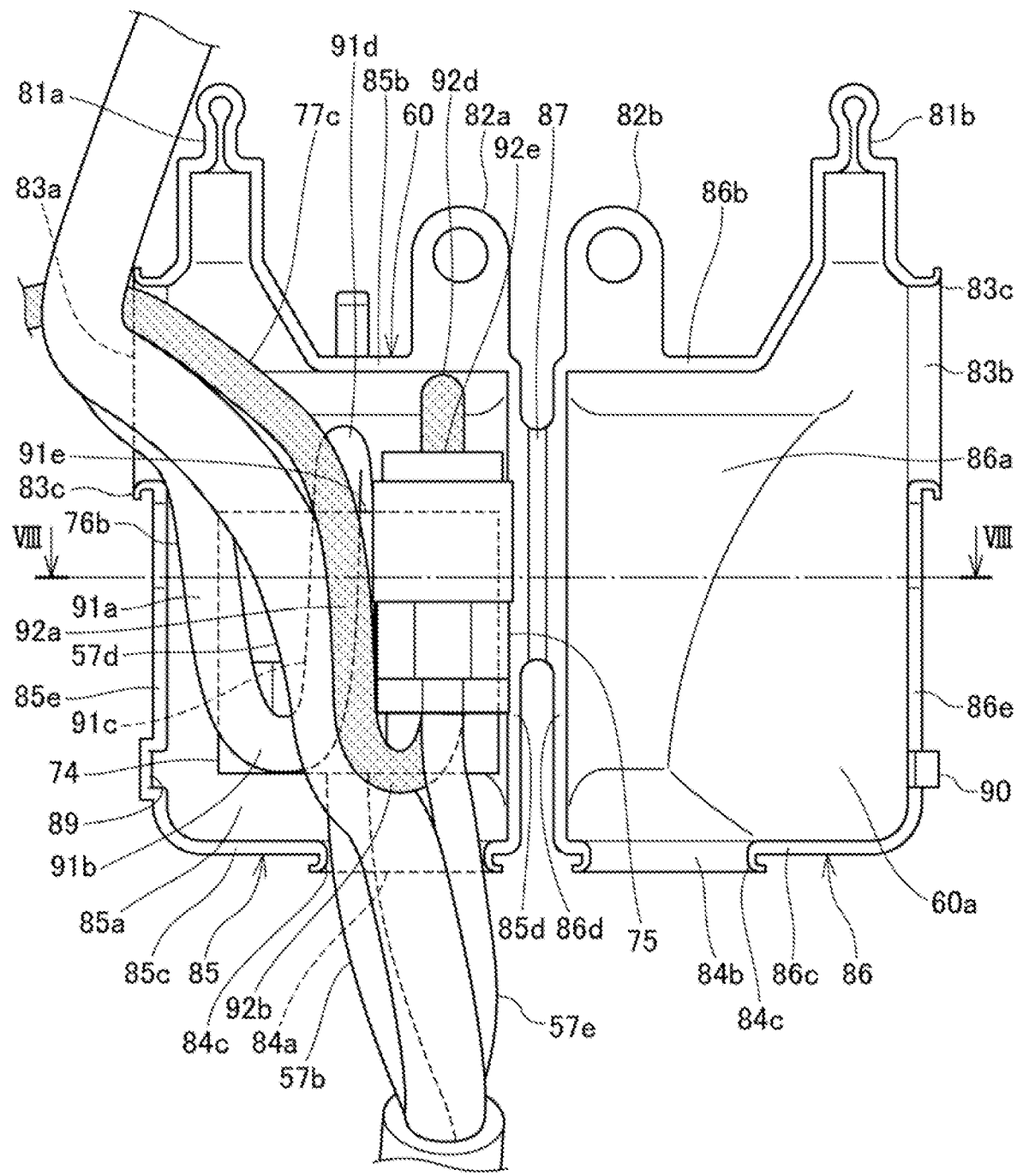
FIG. 7 is a front view, as viewed from the front side, of the electric part accommodating member in an opened state.
Figure 8:
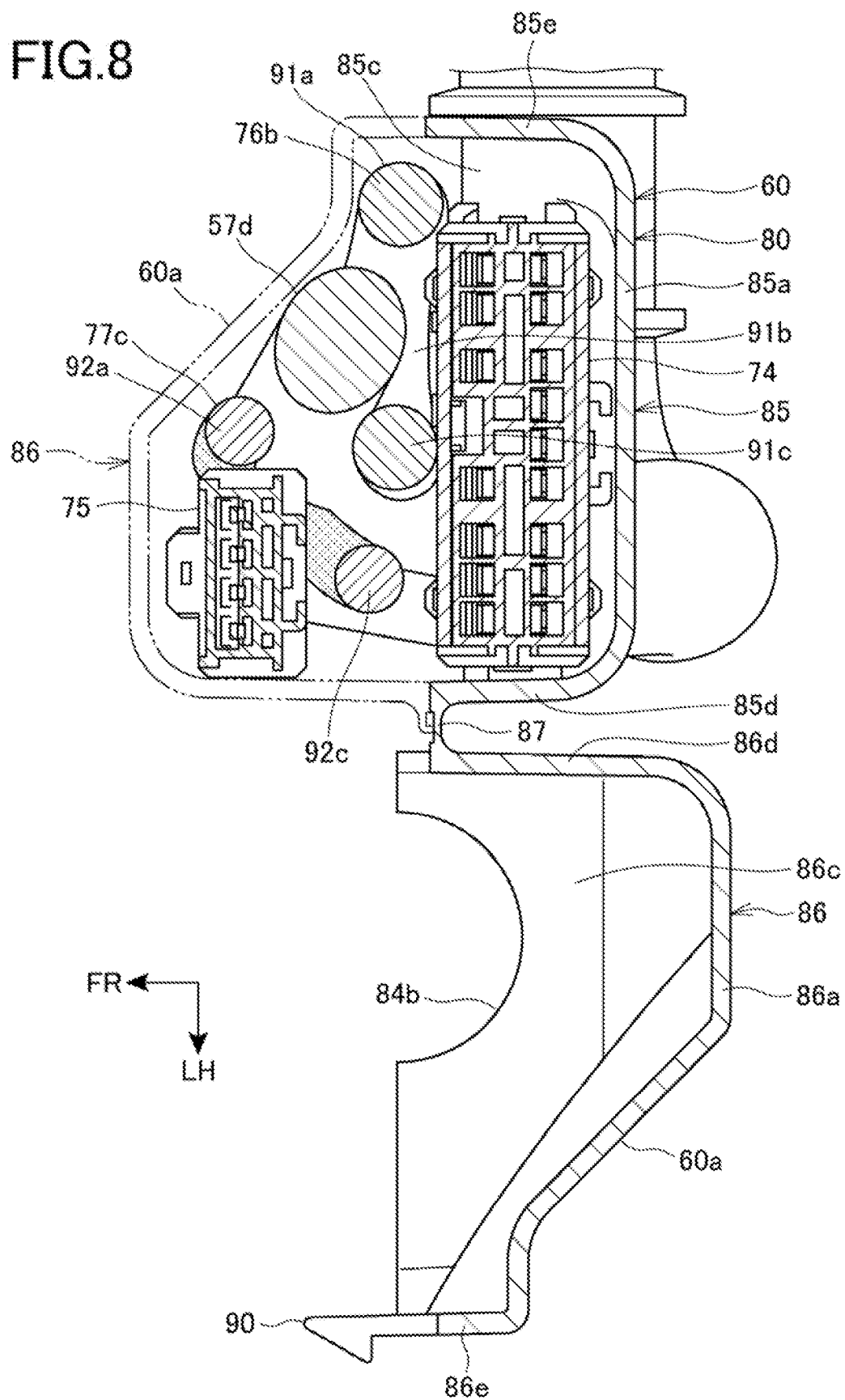
FIG. 8 is a sectional view taken along line VIII-VIII of FIG. 7.

FIG. 7 is a front, view, as viewed from the front side, of the electric part accommodating member 60 in an opened state. FIG. 3 is a sectional view taken along line VIII-VIII of FIG. 7.

Referring to FIGS. 4 to 8, the electric part accommodating member 60 includes a case-shaped case section 85 opening to the vehicle body front side, a lid section 86 covering the case section 85 in a closable and openable manner, and a hinge section 87 connecting the lid section 86 to the case section 85 in a closable and openable manner.

The case section 85, the lid section 86, and the hinge section 87 are integrally formed, and are integrally formed by resin molding, for example.

The case section 85 includes a rear wall section 85a which is substantially rectangular in a vehicle front view, an upper wall section 85b extending forward from an upper edge of the rear wall section 85a, a lower wall section 85c extending forward from a lower edge of the rear wall section 85a, an outer side wall section 85d extending forward from a side edge on the vehicle width directionally outer side of the rear wall section 85a, and an inner side wall section 85e extending forward from a side edge on the vehicle width directionally inner side of the rear wall section 85a.

The case section 85 includes a first fitting section 81a extending upward from the upper wall section 85b, and a first fastening section 82a extending upward from the upper wall section 85b on the lateral side of the first fitting section 81a.

The first fitting section 81a is provided at one end portion in the vehicle width direction of the upper wall section 85b. The first fastening section 82a is provided at the other end portion in the vehicle width direction of the upper wall section 85b, and is located on the vehicle width directionally outer side relative to the first fitting section 81a.

The case section 85 is provided at an upper portion of the inner side wall section 85e with an opening 83a which opens to the vehicle width directionally inner side. In addition, an engaging section 89 for engagement with the lid section 86 is provided at a lower portion of the inner side wall section 85e.

The case section 85 is provided in the lower wall section 85c with an opening 84a which opens to the lower side.

The lid section 86 has a case-like shape opening to the vehicle rear side, and covers the case section 85 from the front side.

The lid section 86 includes a front wall section 86a which is substantially rectangular in a vehicle front view, an upper wall section 86b extending rearward from an upper edge of the front wall section 86a, a lower wall section 86c extending rearward from a lower edge of the front wall section 86a, an outer side wall section 86d extending rearward from a side edge on the vehicle width directionally outer side of the front wall section 86a, and an inner side wall section 86e extending rearward from a side edge on the vehicle width directionally inner side of the front wall section 86a.

The lid section 86 includes a second fitting section 81b extending upward from the upper wall section 86b, and a second fastening section 82b extending upward from the upper wall section 86b on the lateral side of the second fitting section 81b.

The second fitting section 81b is provided at one end portion in the vehicle width direction of the upper wall section 86b. The second fastening section 82b is provided at the other end portion in the vehicle width direction of the upper wall section 86b, and is located on the vehicle width directionally outer side relative to the second fitting section 81b.

The lid section 86 is provided at an upper portion of the inner side wall section 86e with an opening 83b which opens to the vehicle width directionally inner side. In addition, a claw-shaped projected section 90 for engagement with the engaging section 89 of the case section 85 is provided at a lower portion of the inner side wall section 86e.

The lower wall section 86c of the lid section 86 is provided with an opening 84b which opens to the lower side.

The hinge section 87 is a thin plate section that connects the outer side wall section 85d of the case section 85 and the outer side wall section 86d of the lid section 86 in the vehicle width direction, in a state in which the lid section 86 is opened as depicted in FIG. 7.

When the lid section 86 is rotated by approximately 180° with the hinge section 87 as a center from the state of FIG. 7, the lid section 86 is mated with the case section 85, resulting in a state in which the lid section 86 is closed as depicted in FIG. 6.

When the lid section 86 is closed, the upper wall section 85b and the upper wall section 86b are mated with each other, the lower wall section 85c and the lower wall section 86c are mated with each other, the outer side wall section 85d and the outer side wall section 86d are mated with each other, the inner side wall section 85e and the inner side wall section 86e are mated with each other, and the front wall section 86a is opposed to the rear wall section 85a. As a result, the box-shaped section 80 is formed.

In addition, when the lid section 86 is closed, the first fastening section 82a of the case section 85 and the second fitting section 81b of the lid section 86 are mated with each other in the front-rear direction, to form the fitting section 81. The fitting section 81 is a shaft-shaped section extending upward from the box-shaped section 80.

Further, when the lid section 86 is closed, the first fastening section 82a of the case section 85 and the second fastening section 82b of the lid section 86 are mated with each other in the front-rear direction, to form the fastening section 82. The fastening section 82 is a plate-shaped section extending upward from the box-shaped section 80. The fastening section 82 includes a fixing hole 82c penetrating, in the front-rear direction, the first fastening section 82a and the second fastening section 82b which overlap with each other in the front-rear direction.

The fitting section 81 and the fastening section 82 are provided in the state of being aligned in the vehicle width direction at an upper end portion of the electric part accommodating member 60. Specifically, the fitting section 81 is provided at one end portion in the vehicle width direction and is located on the vehicle width directionally inner side relative to the fastening section 82, while the fastening section 82 is provided at the other end portion in the vehicle width direction and is located on the vehicle width directionally outer side relative to the fitting section 81.

When the lid section 86 is closed, the opening 83a of the case section 85 and the opening 83b of the lid section 86 are mated with each other, to form the side-surface opening 83.

The side-surface opening 83 is a substantially circular opening. An inner peripheral surface of the side-surface opening 83 is formed with a curved surface section 83c by which the side-surface opening 83 is gradually enlarged in diameter toward the outside of the side-surface opening 83. In other words, the inner peripheral surface of the side-surface opening 83 is chamfered in a curved surface shape by the curved surface section 83c.

When the lid section 86 is closed, the opening 84a of the case section 85 and the opening 84b of the lid section 86 are mated with each other, to form the lower-surface opening 84.

The lower-surface opening 84 is a substantially circular opening. An inner peripheral surface of the lower-surface opening 84 is formed with a curved surface section 84c by which the lower-surface opening 84 is gradually enlarged in diameter toward the outside of the lower-surface opening 84. In other words, the inner peripheral surface of the lower-surface opening 84 is chamfered in a curved surface shape by the curved surface section 84c.

A front surface of the electric part accommodating member 60 is provided with a recess 60a which is recessed rearward toward the inside of the electric part accommodating member 60. Specifically, the recess 60a is provided in the front wall section 86a of the lid section 86.

Figure 9:
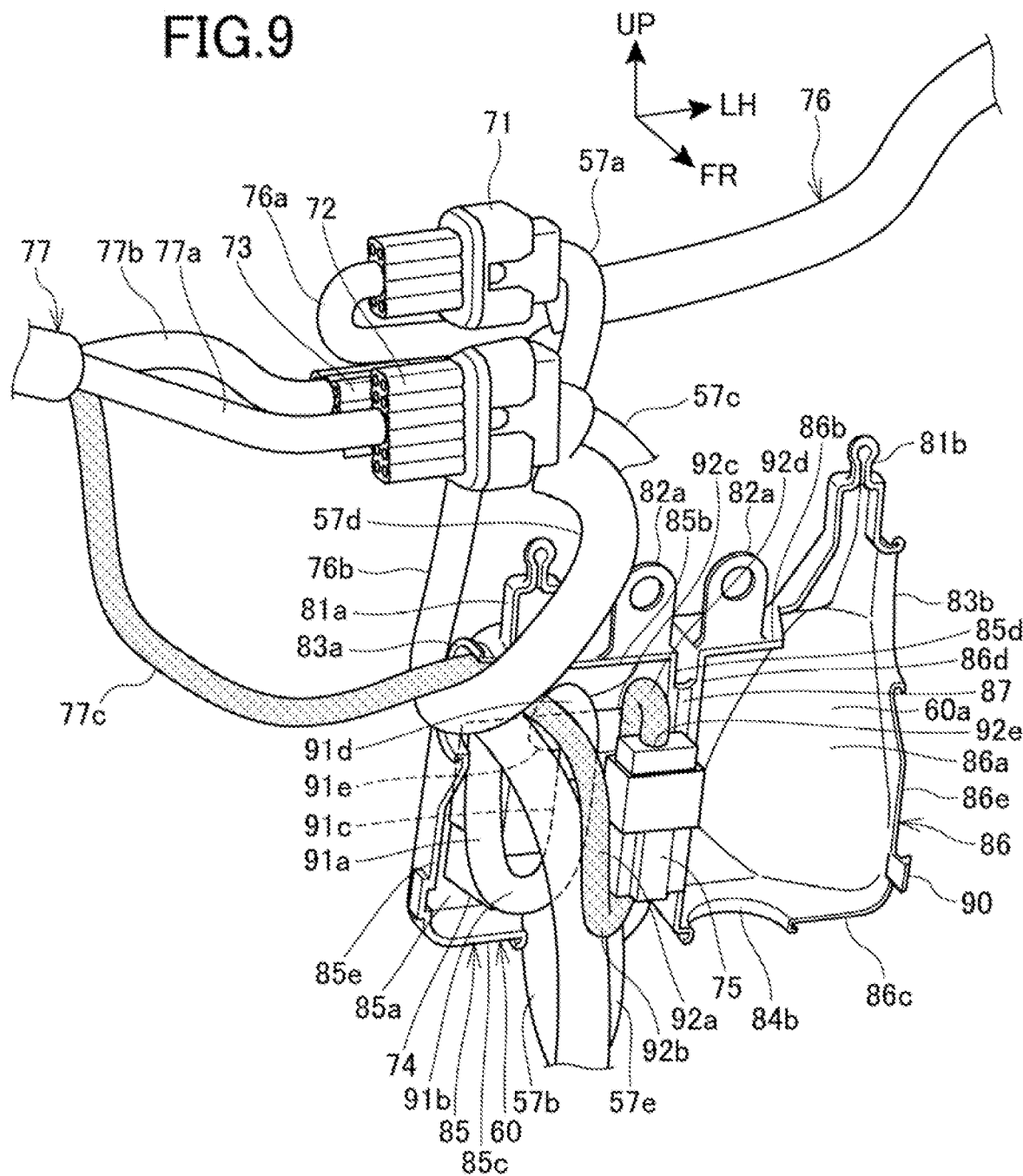
FIG. 9 is a perspective view, as viewed from the front side, of an accommodated state of each harness, a fourth connector, and a fifth connector in the electric part accommodating member.

FIG. 9 is a perspective view, as viewed from the front side, of an accommodated state of the harness 76b, the harness 77c, the harness 57d, the fourth connector 74, and the fifth connector 75 in the electric part accommodating member 60. Here, a state in which the lid section 86 is opened is depicted in FIG. 9. In addition, in FIG. 8, a state in which the lid section 86 is opened is indicated by solid line, while a state in which the lid section 86 is closed is indicated by imaginary line.

Referring to FIGS. 5 to 9, the fourth connector 74 is accommodated in a rear portion of a space inside the box-shaped section 80, and is located inside the case section 85. The fourth connector 74 has a substantially rectangular plate shape in front view.

The fifth connector 75 is accommodated in a front portion of the space inside the box-shaped section 80, and is located inside the lid section 86. The fifth connector 75 is disposed on the front side of the fourth connector 74, and overlaps with the fourth connector 74 from the front side in a vehicle front view.

The fifth connector 75 is smaller in size in the vehicle width direction than the fourth connector 74, and is elongated in the vertical direction. The fifth connector 75 is disposed near a position on the vehicle width directionally outer side, in a space inside the box-shaped section 80, and is located near the hinge section 87.

The harness 76b enters the box-shaped section 80 via the side-surface opening 83, and is connected to the fourth connector 74.

Specifically, in the box-shaped section 80, the harness 76b includes a lower extending section 91a extending downward from the side-surface opening 33, a lower curved section 91b (curved section) turning back upward in a U shape at a lower end of the lower extending section 91a, an upper extending section 91c extending upward from the lower curved section 91b, and an upper curved section 91d turning back downward in a U shape at an upper end of the upper extending section 91c.

The harness 76b has a connection section 91e at a lower end of the upper curved section 91d that is connected to an upper end of the fourth connector 74. The lower curved section 91b and the upper extending section 91c are disposed between the fourth connector 74 and the fifth connector 75 in the front-rear direction. The lower curved section 91b turns back upward toward the vehicle width directionally outer side.

The lower curved section 91b of the harness 76b turns back upward in a U shape below the connection section 91e. Therefore, even if water flowing downward along the lower curved section 91b is present, the water is stopped at the lower curved section 91b. Consequently, the water coming long the lower curved section 91b is restrained from reaching the connection section 91e.

The harness 57b on the power source side extends downward from a lower end of the fourth connector 74, passes through the lower-surface opening 84, and extends toward the outside of the box-shaped section 80.

The harness 77c enters the box-shaped section 80 via the side-surface opening 83, and is connected to the fifth connector 75.

Specifically, in the box-shaped section 80, the harness 77c includes a lower extending section 92a extending downward from the side-surface opening 83, a lower curved section 92b (curved section) turning back upward in a U shape at a lower end of the lower extending section 92a, an upper extending section 92c extending upward from the lower curved section 92b, and an upper curved section 92d turning back downward in a U shape at an upper end of the upper extending section 92c.

The harness 77c has a connection section 92e at a lower end of the upper curved section 92d that is connected to an upper end of the fifth connector 75.

The lower extending section 92a extends downward along a side surface on the vehicle width directionally inner side of the fifth connector 75. The lower curved section 92b turns back upward toward the rear side and the vehicle width directionally outer side. The upper extending section 92c extends upward by passing between the fourth connector 74 and the fifth connector 75.

A lower curved section 92b of the harness 77c turns back upward in a U shape below the connection section 92e. Therefore, even if water flowing downward along the lower curved section 92b is present, the water is stopped at the lower curved section 92b. Consequently, the water flowing along the lower curved section 92b is restrained from reaching the connection section 92e.

The harness 57e on the power source side extends downward from a lower end of the fifth connector 75, and extends toward the outside of the box-shaped section 80 by passing through the lower-surface opening 84.

The harness 57d enters the box-shaped section 80 via the side-surface opening 83, and extends toward the outside of the box-shaped section 80 by passing through the lower-surface opening 84. Specifically, in the box-shaped section 80, the harness 57d extends downward by passing through the front side of the fourth connector 74 and the vehicle width directionally inner side of the fifth connector 75.

The side-surface opening 83 through which the harness 76b, the harness 77c, and the harness 57d are passed has an inner peripheral surface chamfered in a curved surface shape by the curved surface section 83c. Therefore, the inner peripheral surface of the side-surface opening 83 is prevented from strongly colliding against the harness 76b, the harness 77c, and the harness 57d.

In addition, the lower-surface opening 34 through which the harness 76b, the harness 77c, and the harness 57d are passed has an inner peripheral surface chamfered in a curved surface shape by the curved surface section 83c. Therefore, the inner peripheral surface of the lower-surface opening 84 is prevented from strongly colliding against the harness 76b, the harness 77c, and the harness 57d.

Referring to FIGS. 2 to 4 and 6, the electric part accommodating member 60 is disposed in the space 59 surrounded by the left and right fork tubes 26, the top bridge 24, and the bottom bridge 25, and is located on the rear side of the headlight 44.

In a vehicle front view, the electric part accommodating member 60 is disposed at a position between the head pipe 15 and the fork tube 26 on one (left side) of the left and right sides.

The lower surface 24d of the top bridge 24 is provided with a fitting hole 93 in which the fitting section 81 of the electric part accommodating member 60 is fitted. The fitting hole 93 is provided at a position between the head pipe 15 and the fork tube 26 on the left side. In addition, the fitting hole 93 is located on the vehicle width directionally inner side relative to the turn signal support members 54. Further, the fitting hole 93 is located on the front side and on the vehicle width directionally inner side relative to the handle post fastener 28a at the lower surface 24d of the top bridge 24. Here, the fitting hole 93 is a blind hole that does not penetrate the top bridge 24 in the vertical direction, but the fitting hole 93 may be a hole that penetrates the top bridge 24 in the vertical direction.

The electric part accommodating member 60 is fixed to the front fork 12 by a process in which the fitting section 81 is inserted into the fitting hole 93 of the top bridge 24 from below and, thereafter, the fastening section 82 is fastened to the flange section 54d of the turn signal support member 54 by the fastening member 55. Therefore, the number of fastening parts for fixing the electric part accommodating member 60 to the front fork 12 is reduced, so that the electric part accommodating member 60 can be easily fixed to the front fork 12. In addition, since the electric part accommodating member 60 is fixed at a plurality of parts of the fastening section 82 and the fitting section 81, the electric part accommodating member 60 can be firmly fixed to the front fork 12.

In the case of detaching the electric part accommodating member 60, with fastening of the fastening members 55 released, it is possible, by pulling the electric part accommodating member 60 downward, to pull the fitting section 81 out of the fitting hole 93 and to detach the electric part accommodating member 60 from the front fork 12.

The fastening section 82 of the electric part accommodating member 60 is co-fastened to the flange section 54d of the turn signal support member 54 by the fastening member 55. Therefore, by using the fastening member 55 of the turn signal support member 54, the fastening section 82 can be fixed with a simple structure.

The fastening section 82 of the electric part accommodating member 60 is located on the vehicle width directionally outer side relative to the fitting section 81. Therefore, since it is easy to make access to the fastening section 82 from outside, it is possible to easily release the fastening of the fastening member 55, and to detach the electric part accommodating member 60.

The fastening members 55 are bolts fastened to the flange sections 54*d*. Referring to FIGS. 2 and 3, an axis extension line 55*a* obtained by extending an axis of the fastening member 55 toward the front side passes on the vehicle width directionally outer side and the upper side relative to the headlight 44, and does not overlap with the headlight 44. Therefore, at the time of making access to the fastening member 55, the headlight 44 is not liable to serve as an obstacle, so that the fastening member 55 can be easily attached and detached.

The headlight 44 overlaps with the fitting section 81 from the front side in a vehicle front view of FIG. 2.

Of the electric part accommodating member 60, the fitting section 81 formed by mating the first fitting section 81*a* of the case section 85 and the second fitting section 81*b* of the lid section 86 with each other is inserted into the fitting hole 93. As a result, in a state in which the electric part accommodating member 60 is attached to the front fork 12, the lid section 86 is locked in a closed state by the fitting hole 93, so that the lid section 86 can be locked in the closed state with a simple structure.

As illustrated in FIG. 3, the electric part accommodating member 60 mostly overlaps with the fork tubes 26 from the vehicle width directionally inner side in a vehicle side view. Therefore, the electric part accommodating member 60 can be hidden by the fork tubes 26, so that the motorcycle 1 is improved in external appearance.

In addition, the electric part accommodating member 60 is disposed in a rearwardly inclined state along the fork tubes 26 and is disposed on the rear side relative to an extension line 24*e* of a front surface section of the top bridge 24, in a vehicle side view. Therefore, the electric part accommodating member 60 can be disposed to be compact in the longitudinal vehicle direction. Here, the extension line 24*e* is a straight line which is along a front surface section of the top bridge 24 and is substantially parallel to the fork tubes 26, in a vehicle side view.

Since the electric part accommodating member 60 can thus be disposed to be compact in the longitudinal vehicle direction, the headlight 44 can be disposed near the head pipe 15 while being disposed near the rear side. As a result, a front portion of the motorcycle 1 appears simple and is improved in external appearance.

The recess 60*a* in the front surface of the electric part accommodating member 60 is recessed to be located on the rear side toward the vehicle width directionally inner side such as to be along a rear portion of the outer peripheral surface 44*c* of the headlight case 44*a*. Therefore, the headlight 44 can be disposed near the electric part accommodating member 60 on the rear side.

In addition, the headlight 44 is fixed to the front fork 12 through only the bottom bridge 25 by the headlight stay 53 (FIG. 2), and the headlight 44 is not fixed to the top bridge 24. Therefore, a space can be secured between the headlight stay 53 and the top bridge 24, and the electric part accommodating member 60 can be disposed in this space.

As has been described above, according to the embodiment of the present invention, the motorcycle 1 includes the front fork 12 including the pair of left and right fork tubes 26 and the upper-lower pair of the top bridge 24 and the bottom bridge 25 that connect the left and right fork tubes 26, the headlight 44, and the electric part accommodating member 60 accommodating the fourth connector 74 and the fifth connector 75 as electric parts. The electric part accommodating member 60 is disposed on the rear side of the headlight 44 and in the space 59 surrounded by the left and right, fork tubes 26, the top bridge 24, and the bottom bridge 25. The electric part accommodating member 60 includes the fastening section 82 fixed to the front fork 22 by the fastening member 55 and the fitting section 81 fitted and fixed to the top bridge 24.

According to this configuration, in the case of detaching the electric part accommodating member 60, it is possible, by releasing the fastening of the fastening section 82, to pull the fitting section 81 out of the top bridge 24 and to easily detach the electric part accommodating member 60 from the front fork 12. In addition, in the case of attaching the electric part accommodating member 60, the fastening section 82 is fastened in a state in which the fitting section 81 is fitted to the top bridge 24, so that the electric part accommodating member 60 can be attached to the front fork 12 easily and firmly.

In addition, the headlight 44 overlaps with the fitting section 81 from the front side, in a vehicle front view, and the fastening section 82 is disposed on the vehicle width directionally outer side relative to the fitting section 81.

According to this configuration, since the fastening section 82 is disposed on the vehicle width directionally outer side relative to the fitting section 81, access to the fastening section 82 is easy to make, and the fastening of the fastening section 82 and releasing of the fastening can be easily performed. In addition, since the fitting section 81 is only fitted to the top bridge 24, fitting of the fitting section 81 and releasing of the fitting can be easily conducted, notwithstanding the fitting section 81 is located on the vehicle width directionally inner side relative to the fastening section 82.

Besides, the turn signal support members 54 supporting the turn signals 50 are fixed to the fork tubes 26 by the fastening members 55, and the fastening section 82 is co-fastened to the turn signal support member 54 by the fastening member 55.

According to this configuration, by using the fastening member 55 of the turn signal support member 54, the fastening section 82 of the electric part accommodating member 60 can be fixed to the front fork 12 with a simple structure.

Further, the fitting section 81 and the fastening section 82 are provided in the state of being aligned in the vehicle width direction at an upper end portion of the electric part accommodating member 60. The fitting section 81 is provided at one end portion in the vehicle width direction, and the fastening section 82 is provided at the other end portion in the vehicle width direction.

According to this configuration, the electric part accommodating member 60 is fixed by the fitting section 81 and the fastening section 82 which are provided collectively at an upper end portion of the electric part accommodating member 60 and provided spaced apart from each other in the vehicle width direction. Therefore, the electric part accommodating member 60 can be fixed to the front fork 12 easily and firmly.

In addition, the electric parts accommodated in the electric part accommodating member 60 include the fourth connector 74 which connects the harness 76*b* and the harness 57*b* to each other, and the harness 76*b* connected to the fourth connector 74 from above includes the lower curved section 91b curved in a U shape, below the connection section 91e between the harness 76b and the fourth connector 74.

According to this configuration, water flowing along the harness 76b is stopped at the U-shaped lower curved section 91b, so that the water flowing along the harness 76b can be restrained from reaching the connection section 91e between the harness 76b and the fourth connector 74.

Besides, the electric parts accommodated in the electric part accommodating member 60 include the fifth connector 75 connecting the harness 77c and the harness 57e to each other, and the harness 77c connected to the fifth connector 75 from above includes the U-shaped lower curved section 92b, below the connection section 92e between the harness 77c and the fifth connector 75.

According to this configuration, water flowing along the harness 77c is stopped at the U-shaped lower curved section 92b, so that the water flowing along the harness 77c can be restrained from reaching the connection section 92e between the harness 77c and the fifth connector 75.

In addition, the electric part accommodating member 60 includes the side-surface opening 83 through which the harness 76b, the harness 77c, and the harness 57d accommodated in the electric part accommodating member 60 are passed, and an inner peripheral surface of the side-surface opening 83 is provided with the curved surface section 83c where the side-surface opening 83 is gradually enlarged in diameter toward the outside of the side-surface opening 83.

According to this configuration, the inner peripheral surface of the side-surface opening 83 is provided with the curved surface section 83c. Accordingly, the harness 76b, the harness 77c, and the harness 57d are prevented from strongly colliding against the side-surface opening 83, so that the harness 76b, and the harness 77c, and the harness 57d can be protected.

Besides, the electric part accommodating member 60 includes the lower-surface opening 84 through which the harness 57b, the harness 57e, and the harness 57d accommodated in the electric part accommodating member 60 are passed, and the inner peripheral surface of the lower-surface opening 84 is provided with the curved surface section 84c where the lower-surface opening 84 is gradually enlarged in diameter toward the outside of the lower-surface opening 84.

According to this configuration, the inner peripheral surface of the lower-surface opening 84 is provided with the curved surface section 84c. Accordingly, the harness 57b, the harness 57e, and the harness 57d are prevented from strongly colliding against the lower-surface opening 84, so that the harness 57b, the harness 57e, and the harness 57d can be protected.

In addition, the electric part accommodating member 60 overlaps with the fork tubes 26, and is disposed on the rear side relative to the extension line 24e of the front surface section of the top bridge 24, in a vehicle side view.

According to this configuration, the electric part accommodating member 60 can be disposed to be compact in the longitudinal vehicle direction, between the left and right fork tubes 26.

Besides, the front surface of the electric part accommodating member 60 is provided with the recess 60a, and at least a part of the recess 60a is along a rear portion of the headlight 44.

According to this configuration, the headlight 44 can be disposed near the front surface of the electric part accommodating member 60, so that the headlight 44 can be disposed to be compact in the longitudinal vehicle direction.

Further, the electric part accommodating member 60 is a box-shaped member including the case section 85 and the lid section 86 covering the case section 85 in a closable and openable manner, and the electric part accommodating member 60 includes the first fitting section 81a provided at the case section 85 and the second fitting section 81b provided at the lid section 86. When the case section 85 is closed with the lid section 86, the first fitting section 81a and the second fitting section 81b are mated with each other to form the fitting section 81, and the fitting section 81 is inserted into the fitting hole 93 provided in the top bridge 24.

According to this configuration, in a state in which the fitting section 81 formed by mating the first fitting section 81a and the second fitting section 81b with each other is inserted into the fitting hole 93 of the top bridge 24, the lid section 86 is locked in a closed state by the fitting hole 93. Therefore, the lid section 86 covering the case section 85 can be locked in the closed state with a simple structure.

In addition, the electric part accommodating member 60 is a box-shaped member including the case section 85 and the lid section 86 covering the case section 85 in a closable and openable manner. The electric part accommodating member 60 includes the first fastening section 82a provided at the case section 85 and the second fastening section 82b provided at the lid section 86. When the case section 85 is closed with the lid section 86, the first fastening section 82a and the second fastening section 82b are mated with each other to form the fastening section 82, and the fastening member 55 is inserted in and passed through the first fastening section 82a and the second fastening section 82b.

According to this configuration, in a state in which the fastening section 82 formed by mating the first fastening section 82a and the second fastening section 82b with each other is fastened by the fastening member 55, the lid section 86 is locked in a closed state by the fastening member 55. Therefore, the lid section 86 covering the case section 85 can be locked in the closed state with a simple structure.

Besides, the fitting section 81 is inserted into the lower surface 24d of the top bridge 24 from below.

According to this configuration, the electric part accommodating member 60 disposed between the top bridge 24 and the bottom bridge 25 can be easily fixed to the top bridge 24 through the fitting section 81.

Note that the above-described embodiment depicts one mode of the present invention, and the present invention is not limited to the above embodiment.

While a structure in which a shaft-shaped fitting section 81 is fitted to the fitting hole 93 in the top bridge 24 has been taken as an example in the description of the above embodiment, the present invention is not limited to this. For example, a structure may be adopted in which a projection provided on the lower surface 24d of the top bridge 24 is fitted to a fitting section provided in the electric part accommodating member 60.

In addition, while a structure in which the fitting section 81 is fitted to the top bridge 24 has been taken as an example in the description of the above embodiment, this is not limitative. For example, a fitting section provided at a lower end portion of the electric part accommodating member 60 may be fitted to a fitting hole on the upper surface of the bottom bridge 25 which is the bridge on the lower side. In this configuration, the fastening section to be fastened to the front fork may be alignedly disposed on the vehicle width directionally outer side of the fitting section at a lower end portion of the electric part accommodating member 60.

Besides, while the fourth connector 74 and the fifth connector 75 have been taken as examples of the electric parts accommodated in the electric part accommodating member 60 in the above description, the electric parts accommodated in the electric part accommodating member 60 are not limited to the connectors. For example, a control part for electric equipment, sensors, a fuse, and the like may also be accommodated in the electric part accommodating member 60.

Further, while the motorcycle 1 has been taken as an example in the description of the above embodiment, the present invention is not limited to this. The present invention is applicable to a three-wheeled saddle riding vehicle having two front wheels or two rear wheels and saddle riding vehicles having four or more wheels.

DESCRIPTION OF REFERENCE SYMBOLS

1 Motorcycle (saddle riding vehicle)
12 Front fork
24 Top bridge (bridge, bridge on the upper side)
24d Lower surface
24e Extension line
25 Bottom bridge (bridge)
26 Fork tube
44 Headlight
50 Turn signal
54 Turn signal support member
55 Fastening member
59 Space
60 Electric part accommodating member
74 Fourth connector (electric part)
75 Fifth connector (electric part)
76b Harness (harness connected to connector from above, harness accommodated in electric part accommodating member)
77c Harness (harness connected to connector from above, harness accommodated in electric part accommodating member)
57b Harness (harness accommodated in electric part accommodating member)
57d Harness (harness accommodated in electric part accommodating member)
57e Harness (harness accommodated in electric part accommodating member)
60a Recess
81 Fitting section
81a First fitting section
81b Second fitting section
82 Fastening section
82a First fastening section
82b Second fastening section
83 Side-surface opening (opening)
83c Curved surface section
84 Lower-surface opening (opening)
84c Curved surface section
85 Case section
86 Lid section
91b Lower curved section (curved section)
91e Connection section
92b Lower curved section (curved section)
92e Connection section
93 Fitting hole

The invention claimed is:

1. A saddle riding vehicle comprising:
a front fork including a pair of left and right fork tubes and a pair of top and bottom bridges connecting the left and right fork tubes;
a headlight; and
an electric part accommodating member accommodating an electric part, the electric part accommodating member being disposed on a rear side of the headlight in a space surrounded by the left and right fork tubes and the top and bottom bridges,
wherein the electric part accommodating member includes a fastening section fixed to the front fork by a fastening member and a fitting section fitted and fixed to one of the bridges, and
wherein the headlight overlaps with the fitting section from a front side, in a vehicle front view, and the fastening section is disposed on a vehicle width directionally outer side relative to the fitting section.

2. The saddle riding vehicle according to claim 1, wherein a turn signal support member supporting a turn signal is fixed to one of the fork tubes by the fastening member, and the fastening section is co-fastened to the turn signal support member by the fastening member.

3. The saddle riding vehicle according to claim 1, wherein the fitting section and the fastening section are provided in a state of being aligned in a vehicle width direction at an upper end portion or a lower end portion of the electric part accommodating member, and
the fitting section is provided at one end portion in the vehicle width direction, while the fastening section is provided at the other end portion in the vehicle width direction.

4. The saddle riding vehicle according to claim 1, wherein the electric part is a connector connecting harnesses to one another, and
one of the harnesses connected to the connector from above includes a curved section curved in a U shape below a connection section between the harness and the connector.

5. The saddle riding vehicle according to claim 1, wherein the electric part accommodating member includes an opening through which a harness accommodated in the electric part accommodating member is passed, and an inner peripheral surface of the opening is provided with a curved surface section where the opening is gradually increased in diameter toward an outer side of the opening.

6. The saddle riding vehicle according to claim 1, wherein the electric part accommodating member overlaps with the fork tubes, and is disposed on a rear side relative to an extension line of a front surface section of the bridge on the upper side, in a vehicle side view.

7. The saddle riding vehicle according to claim 1, wherein a front surface of the electric part accommodating member is provided with a recess, and at least a part of the recess is along a rear portion of the headlight.

8. The saddle riding vehicle according to claim 1, wherein the electric part accommodating member is a box-shaped member including a case section and a lid section covering the case section in a closable and openable manner,
the electric part accommodating member includes a first fitting section provided at the case section and a second fitting section provided at the lid section, and
when the case section is closed with the lid section, the first fitting section and the second fitting section are mated with each other to form the fitting section, and the fitting section is inserted into a fitting hole provided in the bridge.

9. The saddle riding vehicle according to claim 1,
wherein the electric part accommodating member is a box-shaped member including a case section and a lid section covering the case section in a closable and openable manner,
the electric part accommodating member includes a first fastening section provided at the case section and a second fastening section provided at the lid section, and
when the case section is closed with the lid section, the first fastening section and the second fastening section are mated with each other to form the fastening section, and the fastening member is inserted in and passed through the first fastening section and the second fastening section.

10. The saddle riding vehicle according to claim 1,
wherein the fitting section is inserted into a lower surface of the bridge on the upper side from below.

11. A saddle riding vehicle comprising:
a front fork including a pair of left and right fork tubes and a pair of top and bottom bridges connecting the left and right fork tubes;
a headlight; and
an electric part accommodating member accommodating an electric part, the electric part accommodating member being disposed on a rear side of the headlight in a space surrounded by the left and right fork tubes and the top and bottom bridges,
wherein the electric part accommodating member includes a fastening section fixed to the front fork by a fastening member and a fitting section fitted and fixed to one of the bridges, and
wherein the electric part accommodating member overlaps with the fork tubes, and is disposed on a rear side relative to an extension line of a front surface section of the bridge on the upper side, in a vehicle side view.

12. A saddle riding vehicle comprising:
a front fork including a pair of left and right fork tubes and a pair of top and bottom bridges connecting the left and right fork tubes;
a headlight; and
an electric part accommodating member accommodating an electric part, the electric part accommodating member being disposed on a rear side of the headlight in a space surrounded by the left and right fork tubes and the top and bottom bridges,
wherein the electric part accommodating member includes a fastening section fixed to the front fork by a fastening member and a fitting section fitted and fixed to one of the bridges, and
wherein a front surface of the electric part accommodating member is provided with a recess, and at least a part of the recess is along a rear portion of the headlight.

\* \* \* \* \*